United States Patent
Iwamoto et al.

(10) Patent No.: US 10,232,539 B2
(45) Date of Patent: Mar. 19, 2019

(54) METHOD FOR MANUFACTURING LONG MEMBER

(71) Applicant: TOKAI KOGYO CO., LTD., Obu-shi, Aichi (JP)

(72) Inventors: Hideki Iwamoto, Obu (JP); Akihiko Shirakawa, Obu (JP); Mitsuru Okuda, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 0 days.

(21) Appl. No.: 15/546,587

(22) PCT Filed: Jan. 6, 2016

(86) PCT No.: PCT/JP2016/050201
§ 371 (c)(1),
(2) Date: Jul. 26, 2017

(87) PCT Pub. No.: WO2016/121426
PCT Pub. Date: Aug. 4, 2016

(65) Prior Publication Data
US 2018/0009149 A1    Jan. 11, 2018

(30) Foreign Application Priority Data
Jan. 27, 2015    (JP) .................................. 2015-013345

(51) Int. Cl.
*B29C 53/08* (2006.01)
*B29C 47/02* (2006.01)
(Continued)

(52) U.S. Cl.
CPC ............ *B29C 47/025* (2013.01); *B21D 53/88* (2013.01); *B29C 47/02* (2013.01);
(Continued)

(58) Field of Classification Search
None
See application file for complete search history.

(56) References Cited

U.S. PATENT DOCUMENTS 4,959,081 A    9/1990    Mathellier

FOREIGN PATENT DOCUMENTS

| JP | S57-095434 A | 6/1982 |
| JP | S59-179222 A | 10/1984 |

(Continued)

OTHER PUBLICATIONS

Feb. 9, 2016 International Search Report issued in International Patent Application No. PCT/JP2016/050201.
(Continued)

*Primary Examiner* — Edmund H Lee
(74) *Attorney, Agent, or Firm* — Oliff PLC

(57) ABSTRACT

A weather strip including a bottom wall, a first lateral wall and a second lateral wall and in which an angle between the bottom wall and the first lateral wall is constant and an angle between the bottom wall and the second lateral wall is partially varied in a longitudinal direction is manufactured. The method includes: a first step of pre-forming the angle of the first lateral wall and the angle of the second lateral wall to be constant and equal to or larger than final maximum angles; a second step of regulating a boundary between the bottom wall and the second lateral wall from moving toward the first lateral wall by a regulating member; a third step of partially varying the angle of the second lateral wall by a movable roller; and a fourth step of forming the angle of the first lateral wall by a fine-movable roller.

8 Claims, 4 Drawing Sheets

(51) Int. Cl.
  *B21D 53/88*  (2006.01)
  *B29C 53/02*  (2006.01)
  *B29C 47/10*  (2006.01)
  *B29C 47/88*  (2006.01)
  *B29D 99/00*  (2010.01)
  *B60R 13/06*  (2006.01)
  *B60J 10/18*  (2016.01)
  *B60J 10/84*  (2016.01)
  *B29K 705/00* (2006.01)
  *B29L 31/30*  (2006.01)
  *B29L 31/26*  (2006.01)
  *B29K 21/00*  (2006.01)
  *B29K 23/00*  (2006.01)
  *B60J 10/24*  (2016.01)
  *B60J 10/32*  (2016.01)

(52) U.S. Cl.
  CPC ...... *B29C 47/1036* (2013.01); *B29C 47/8805* (2013.01); *B29C 47/8895* (2013.01); *B29C 53/02* (2013.01); *B29C 53/08* (2013.01); *B29C 53/083* (2013.01); *B29C 53/086* (2013.01); *B29D 99/0053* (2013.01); *B29K 2021/003* (2013.01); *B29K 2023/16* (2013.01); *B29K 2705/00* (2013.01); *B29L 2031/26* (2013.01); *B29L 2031/3014* (2013.01); *B60J 10/18* (2016.02); *B60J 10/24* (2016.02); *B60J 10/32* (2016.02); *B60J 10/84* (2016.02); *B60R 13/06* (2013.01)

(56) References Cited

FOREIGN PATENT DOCUMENTS

| | | |
|---|---|---|
| JP | H02-175128 A | 7/1990 |
| JP | H05-147098 A | 6/1993 |
| JP | H10-053076 A | 2/1998 |
| JP | 2000-033840 A | 2/2000 |

OTHER PUBLICATIONS

Feb. 9, 2016 Written Opinion issued in International Patent Application No. PCT/JP2016/050201.

METHOD FOR MANUFACTURING LONG MEMBER

TECHNICAL FIELD

The present invention relates to a method for manufacturing a long member made of a polymer material through extrusion molding, the long member including a holding portion including: a bottom wall; a first lateral wall and a second lateral wall which stand from both ends of the bottom wall; and a metal core member that is embedded in the bottom wall, the first lateral wall, and the second lateral wall from the bottom wall to the first lateral wall and the second lateral wall, an angle between the bottom wall and the first lateral wall being constant throughout in a longitudinal direction while an angle between the bottom wall and the second lateral wall being partially varied in the longitudinal direction.

BACKGROUND ART

A door, a lid, or the like for closing an opening is provided on a vehicle opening such as an entrance/exit or a trunk room of an automobile, and a weather strip for sealing a gap between the opening and the door, the lid, or the like is installed on the periphery of the opening. In addition, a flange that reinforces the opening is provided on the periphery of the vehicle opening. The weather strip is a long member made of a polymer material through extrusion molding and includes a seal portion having a hollow cylindrical shape and a holding portion. The holding portion is configured to include a bottom wall and a first lateral wall and a second lateral wall which stand from both ends of the bottom wall and has a substantially U-shaped cross section. The seal portion is provided on an outer surface of the first lateral wall, which is located at a vehicle exterior side in a state in which the weather strip is installed on the flange, and holding lips that hold the flange at the periphery of the vehicle opening are provided on the inner surfaces of the first lateral wall and the second lateral wall.

The weather strip is installed due to the holding lips of the holding portion holding the flange, and the seal portion comes into contact with the door, the lid, or the like such that the gap between the vehicle opening and the door, the lid, or the like is sealed. In addition, in order to cover and hide the flange, a product having only the holding portion without the seal portion is installed on the flange, in some cases.

Here, a thickness of the flange is different depending on a region of the opening. The flange is made of one metal plate at a thin region, but is configured to be made of three or more metal plates, which overlap each other and are subjected to spot welding, at a thick region. In related art, the holding portion of the weather strip is formed to have a constant opening width corresponding to the thickness of the thinnest region of the flange. In other words, an angle between the bottom wall and the first lateral wall and an angle between the bottom wall and the second lateral wall of the holding portion are constant throughout in the longitudinal direction. In such case, since a load required for inserting the flange into the holding portion increases in a region in which the flange has a large thickness, it is difficult to install the weather strip on the flange. Therefore, JP-A-2000-33840, JP-A-H02-175128, and JP-A-H05-147098 disclose inventions in which an opening width of a holding portion that is installed on a flange is partially varied depending on a thickness of the flange, specifically, inventions in which an angle between a bottom wall and a lateral wall on the vehicle interior side is partially varied in a longitudinal direction in a state in which a weather strip is installed on the flange.

In JP-A-2000-33840, using a dedicated molding apparatus having an accommodating groove at the center, the opening width of the holding portion is varied corresponding to the thickness of the flange by causing the angle between a second lateral wall (lateral wall on the vehicle interior side) and the bottom wall of the weather strip after extrusion molding to be partially varied in the longitudinal direction. Specifically, by setting a part of the weather strip, whose holding portion is formed to have a constant opening width corresponding to the thickness of the thinnest region of the flange, in an accommodating groove of the molding apparatus, and then driving a wedge-shaped jig into a space between the first lateral wall and the second lateral wall, the second lateral wall is expanded outward. In this manner, a weather strip having a wide portion in a part of the holding portion is obtained.

In JP-A-H02-175128, first, a preform of a weather strip, which is extruded (pre-formed) from an extruder such that angles of a first lateral wall and a second lateral wall with respect to a bottom wall is larger than a maximum angle of a finally completed product, is passed between a pair of rollers having a constant interval. In this manner, the first lateral wall and the second lateral wall are each pressed at a predetermined constant angle by the rollers from the outer side, and thereby a weather strip in which an opening width of the holding portion corresponds to the thickest region of the flange is obtained. Subsequently, the weather strip is further passed between a pair of rollers including a movable roller having a rotary shaft that can be displaced inward and outward in a width direction thereof and a fixed roller having a rotary shaft that is not displaced at a predetermined position. Thereby, the opening width of the holding portion is partially varied in the longitudinal direction corresponding to the thickness of the flange. Specifically, in a region corresponding to a region in which the flange has a small thickness, the movable roller is further displaced inward so as to further press the second lateral wall inward, and thereby an acute angle is formed between the second lateral wall and the bottom wall.

Also in JP-A-H05-147098, a preform of a weather strip is passed between a pair of rollers including a movable roller having a rotary shaft that can be displaced inward and outward in a width direction thereof and a fixed roller having a rotary shaft that is not displaced at a predetermined position and, similar to JP-A-2-175128, the movable roller is displaced inward and outward corresponding to a thickness of a flange. In this manner, an angle formed between the second lateral wall and the bottom wall is partially varied in a longitudinal direction thereof.

SUMMARY OF INVENTION

Technical Problem

In JP-A-2000-33840, dedicated molding apparatuses and wedge-shaped jigs need to be provided according to the number of regions in which the flange has different thicknesses. Here, since a plurality of molding apparatuses provided with the accommodating grooves having different widths and jigs need to be provided, not only manufacturing costs increase, but also manufacturing processes become complicated because the angle of the second lateral wall needs to be varied for each region. Therefore, in a case where a vehicle opening has many regions in which the flange has different thicknesses, it is difficult to use a technology disclosed in JP-A-2000-33840.

On the other hand, in JP-A-H02-175128 and JP-A-H05-147098, the second lateral wall is pressed from the outer side by the movable roller that can be displaced inward and outward in the width direction of the weather strip in an extrusion molding process of the weather strip, and the angle formed between the bottom wall and the second lateral wall is partially varied in the longitudinal direction. More specifically, as illustrated in FIG. 8, among two rollers that press a first lateral wall 102 and a second lateral wall 103 from the outer side, while an angle between the first lateral wall 102 and the bottom wall 101 is made constant throughout in the longitudinal direction by a fixed roller 112, a movable roller 113 is displaced inward and outward such that the angle of the second lateral wall 103 is partially varied in the longitudinal direction. Note that, in FIG. 8, reference sign 100 represents a holding portion of the weather strip, reference sign 104 represents a core member, and reference sign 105 represents a holding lip.

Here, when the movable roller 113 is displaced inward so as to narrow the opening width of the holding portion 100, a force having the same size also acts on the first lateral wall 102 from the fixed roller 112 due to a relationship of action and reaction. In other words, the same moment acts on the first lateral wall 102 and the second lateral wall 103 with each intersection point of the walls with the bottom wall 101 serving as a rotation center. However, in JP-A-H02-175128 and JP-A-H05-147098, when angles of the first lateral wall 102 and the second lateral wall 103 with respect to the bottom wall 101 are formed, movement of the holding portion 100 is not particularly regulated in the width direction thereof. Hence, in JP-A-H02-175128 and JP-A-H05-147098, when the movable roller 113 is displaced inward, the angle of the second lateral wall 103 is not only varied as illustrated in FIG. 8, but actually, as illustrated in FIG. 9, the bottom wall 101 is displaced to the fixed roller 112 side due to a pressing force of the movable roller 113, and the holding portion 100 always moves to the center between the fixed roller 112 and the movable roller 113. In other words, when only the movable roller 113 is displaced inward so as to narrow the opening width of the holding portion 100, the bottom wall 101 has a positional shift such that the center line L of the holding portion 100 in the width direction is also always coincident with the center between the fixed roller 112 and the movable roller 113. In this state, it is not possible to partially vary only the angle of the second lateral wall 103, and the angle of the first lateral wall 102 is also actually varied, similar to the angle of the second lateral wall 103.

Here, since an angle of a seal portion provided on an outer surface of the first lateral wall is also varied together with the first lateral wall, a contact position between the seal portion and the door is changed, and there is a concern that water will leak through the changed contact portion. Accordingly, an object of the present invention is to provide a method for manufacturing a long member in which an angle between a bottom wall and a first lateral wall is not varied when an angle between the bottom wall and a second lateral wall is partially varied according to a thickness of a flange, during manufacturing of the long member such as a weather strip in which an opening width of a holding portion is partially varied through extrusion molding.

Means for Solving the Problems

A method for manufacturing a long member made of a polymer material through extrusion molding, the long member including a holding portion including: a bottom wall; a first lateral wall and a second lateral wall which stand from both ends of the bottom wall; and a metal core member that is embedded in the bottom wall, the first lateral wall, and the second lateral wall from the bottom wall to the first lateral wall and the second lateral wall, an angle between the bottom wall and the first lateral wall being constant throughout in a longitudinal direction, and an angle between the bottom wall and the second lateral wall being partially varied in the longitudinal direction, the method comprising: a first step of pre-forming the angle between the bottom wall and the first lateral wall and the angle between the bottom wall and the second lateral wall to be constant in the longitudinal direction and equal to or larger than final maximum angles thereof; a second step of regulating a boundary between the bottom wall and the second lateral wall from moving toward the first lateral wall after the first step; and a third step of forming the angle between the bottom wall and the second lateral wall into a final angle by partially varying, in the longitudinal direction, the angle between the bottom wall and the second lateral wall. In this configuration, in the second step, since the entire holding portion including the boundary between the bottom wall and the second lateral wall is regulated from moving toward the first lateral wall, the angle of the first lateral wall is prevented from being inadvertently changed when the final angle is formed by partially varying the second lateral wall in the third step.

In the second step, a regulating member can be brought into contact with an inner surface of the boundary between the bottom wall and the second lateral wall or an outer surface of a boundary between the bottom wall and the first lateral wall. In this manner, when the angle of the second lateral wall is partially varied, the entire holding portion is prevented from inadvertently moving toward the first lateral wall, and a position of an intersection point, at which the first lateral wall and the second lateral wall are bent, is fixed. In particular, when the regulating member is brought into contact with the inner surface of the boundary between the bottom wall and the second lateral wall, the angle of the second lateral wall is varied with the contact region with the regulating member serving as the intersection point when the angle of the second lateral wall is formed. Therefore, reliability of forming the angle is improved.

Further, the method includes a fourth step of forming the angle between the bottom wall and the first lateral wall into a final angle after the first step. At this time, since the entire holding portion is prevented from moving, the entire angle of the first lateral wall is constant in the longitudinal direction, and thus a step is prevented from being formed.

In the third and fourth steps, a second pressing member and a first pressing member, which are capable of being displaced in an inward/outward direction in a width direction of the long member, press the second lateral wall and the first lateral wall inward, respectively, from outer sides of the second lateral wall and the first lateral wall.

In the fourth step, it is preferable that a positioning member that holds at least a part of an inner surface and an upper end of the first lateral wall is provided. Here, when the long member is subjected to extrusion molding, the long member is extruded while vibrating in a vertical direction or a horizontal direction due to impacts of processing. When the vibration is large, there is a concern that the first pressing member will deviate from a position at which the first pressing member presses the first lateral wall, and thus it is not possible for the first pressing member to press the first lateral wall in the worst case. When the positioning member that holds the inner surface and the top surface of the first lateral wall is provided, it is possible to avoid such problems.

Further, in the fourth step, in a case where the bottom wall is subjected to a positional shift in the width direction, it is preferable that the first pressing member is displaced in the inward/outward direction, corresponding to the positional shift. The regulating member is provided to avoid the inadvertent inward and outward movement of the entire holding portion. However, the regulating member may not always reliably prevent the inadvertent movement, and thus there is a concern that the holding portion will inadvertently move from a predetermined position (positional shift) depending on the angle of the second lateral wall or the like in the pre-forming stage. In such a case, since the first pressing member is displaced in the inward/outward direction corresponding to the positional shift of the bottom wall from the predetermined position, it is possible to allow the positional shift of the entire holding portion including the bottom wall. Accordingly, it is possible to reliably form the first lateral wall and the second lateral wall to have a predetermined angle.

Further, it is preferable that the second step and the third step are simultaneously performed, and it is also preferable that the second step to the fourth step are simultaneously performed. In this manner, the time taken to manufacture the long member is shortened and productivity is improved.

Advantageous Effects of Invention

According to the present invention, during manufacturing of the long member such as a weather strip in which the opening width of the holding portion is partially varied through the extrusion molding, the angle between the bottom wall and the first lateral wall is prevented from being inadvertently formed as an angle other than the predetermined angle when the angle between the bottom wall and the second lateral wall is partially varied according to a thickness of a flange.

DESCRIPTION OF EMBODIMENTS

First, a long member which is a manufacturing target of the present invention is described. As long as the long member which is the manufacturing target of the present invention is configured to include a holding portion including a bottom wall, a first lateral wall and a second lateral wall which stand from both ends of the bottom wall, and a metal core member that is embedded in the bottom wall, the first lateral wall, and the second lateral wall from the bottom wall to the first lateral wall and the second lateral wall, and is to be installed and fixed by the holding portion holding a plate-shaped member of an installation target object, there is no particular limitation on use. Typically, an example of the long member includes a weather strip that is installed on the periphery of a vehicle opening of a vehicle such as an automobile and seals a gap between the opening and a door, a lid, or the like. Hereinafter, an example of manufacturing the weather strip as the long member will be described.

Figure 1:
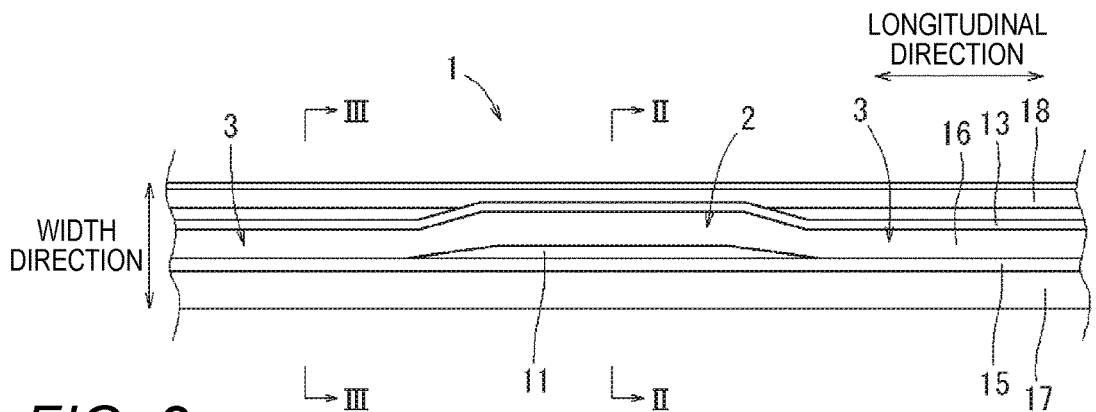
FIG. 1 is a plan view of a weather strip.
Figure 2:
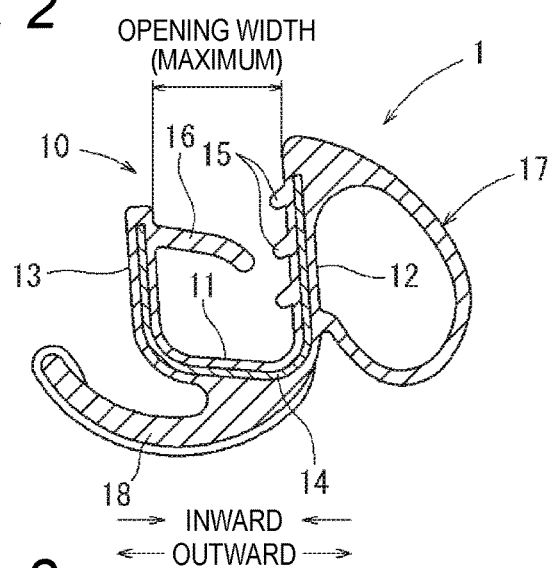
FIG. 2 is a sectional view taken along line II-II in FIG. 1.
Figure 3:
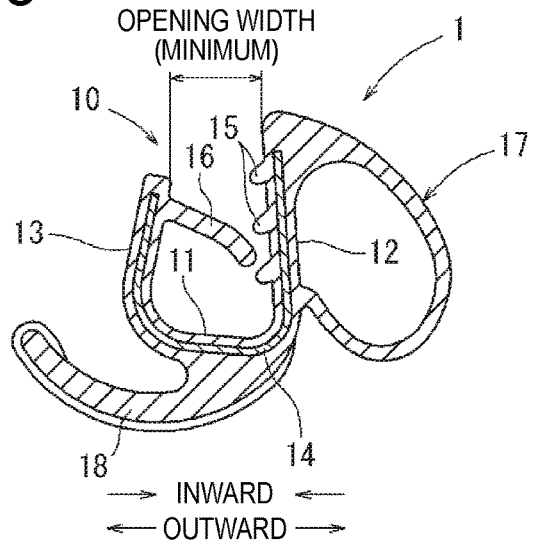
FIG. 3 is a sectional view taken along line in FIG. 1.

A basic configuration of a weather strip 1 is the configuration known to be used as a seal member of the vehicle opening in the related art. As illustrated in FIGS. 1 to 3, the weather strip includes a holding portion 10 having a substantially U-shaped cross section. The holding portion 10 is configured to include a bottom wall 11 and a first lateral wall 12 and a second lateral wall 13 which stand from both ends of the bottom wall 11. In order to form an angle between the bottom wall 11 and the first lateral wall 12 and an angle between the bottom wall 11 and the second lateral wall 13, that is, to maintain an opening width of the holding portion 10, a metal core member 14 made of one plate is embedded inside the holding portion 10 from the first lateral wall 12 to the second lateral wall 13. A plurality of short holding lips 15 are formed to integrally project on an inner surface of the first lateral wall 12. On the other hand, one long holding lip 16 is formed to integrally project on an inner surface of the second lateral wall 13. In addition, a hollow cylindrical seal portion 17 is provided on an outer surface of the first lateral wall 12, and a tongue-shaped decorative lip 18 is integrally formed on an outer surface of the bottom wall 11.

Except for the core member 14, the weather strip 1 is made of an elastically deformable polymer material such as rubber, a thermoplastic resin, or a thermoplastic elastomer, and is manufactured through extrusion molding. Note that the weather strip 1 may be entirely made of the same material except for the core member 14, or may be partially made of different polymer materials. For example, the holding portion 10 can be made of the thermoplastic elastomer and the seal portion 17 can be made of foamed rubber. In addition, it is possible to partially provide a cover layer.

The weather strip 1 having the configuration is installed on the vehicle by the holding portion 10 engaged with a flange on the periphery of the vehicle opening. At this time, the holding lips 15 and the holding lip 16 come into elastic pressure contact with the flange, and thereby the weather strip 1 is securely fixed without falling off. When a vehicle door is closed, the seal portion 17 is pressed against the door frame, and the vehicle opening is sealed. In this respect, the first lateral wall 12 is a lateral wall on the vehicle exterior side and the second lateral wall 13 is a lateral wall on the vehicle interior side. Meanwhile, in a state in which the vehicle door is opened, the decorative lip 18 is exposed, and the design is improved.

Here, the flange of the vehicle opening has a region made of one metal plate and a region made of a plurality of overlapped metal plates, and a thickness thereof is partially varied. Therefore, an opening width (distance between the upper end of the first lateral wall 12 and the upper end of the second lateral wall 13) of the holding portion 10 is partially different in a longitudinal direction thereof depending on the thickness of the flange. Specifically, as illustrated in FIG. 1, wide portions 2 (refer to FIG. 2) corresponding to regions in which the flange has an increase in thickness and narrow portions 3 (refer to FIG. 3) corresponding to regions in which the flange has a decrease in thickness are mixed to be continuous in the longitudinal direction.

On the basis of the description described above, a representative method for manufacturing the weather strip 1 (embodiment) is described. The opening width of the holding portion 10 in the weather strip 1 is set by angles of the first lateral wall 12 and the second lateral wall 13 with respect to the bottom wall 11. In the embodiment, an angle between the bottom wall 11 and the first lateral wall 12 and an angle between the bottom wall 11 and the second lateral wall 13 of a finally completed product in the weather strip 1 is formed by a variable bender device (bending device of the long member) 20 illustrated in FIG. 4.

Figure 4:
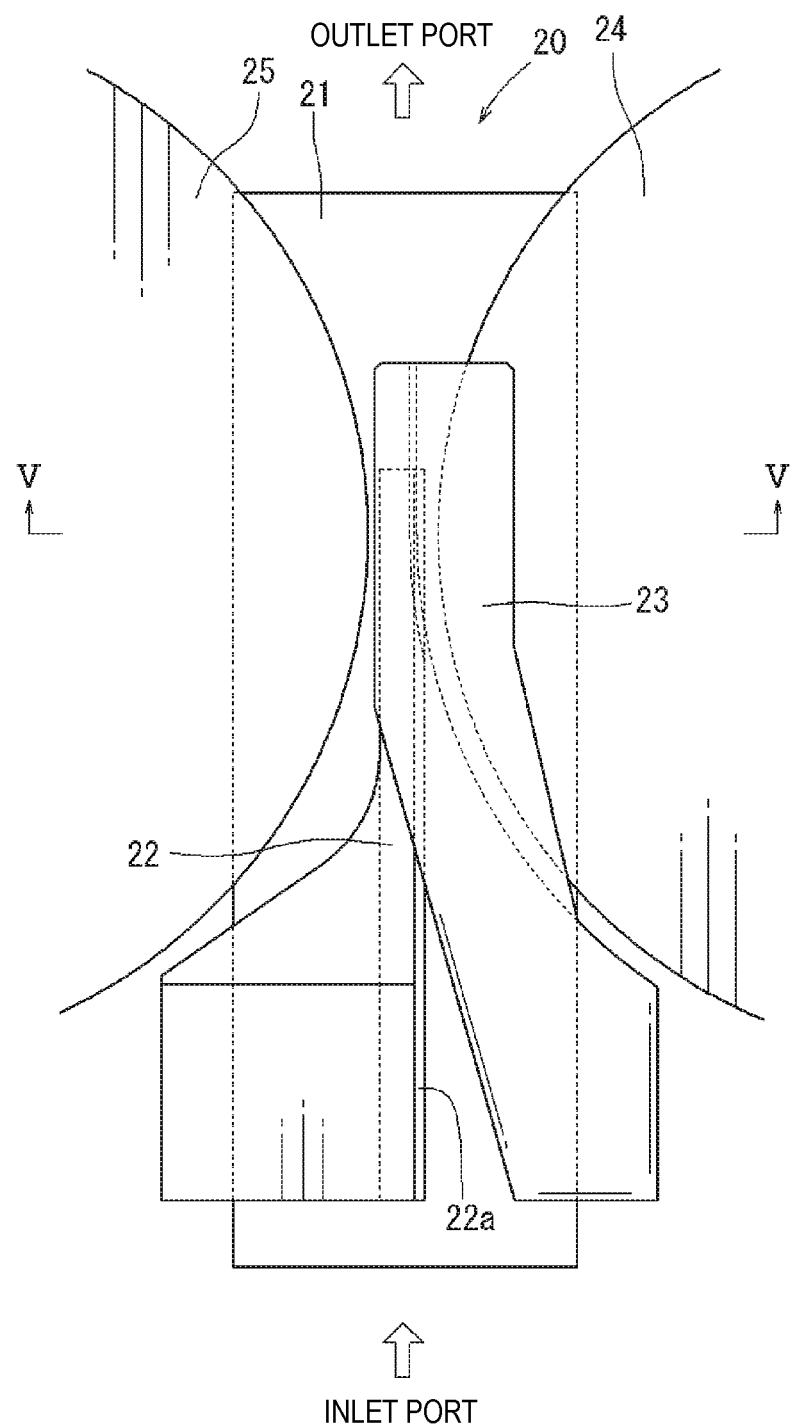
FIG. 4 is a plan view of an extruder device.
Figure 5:
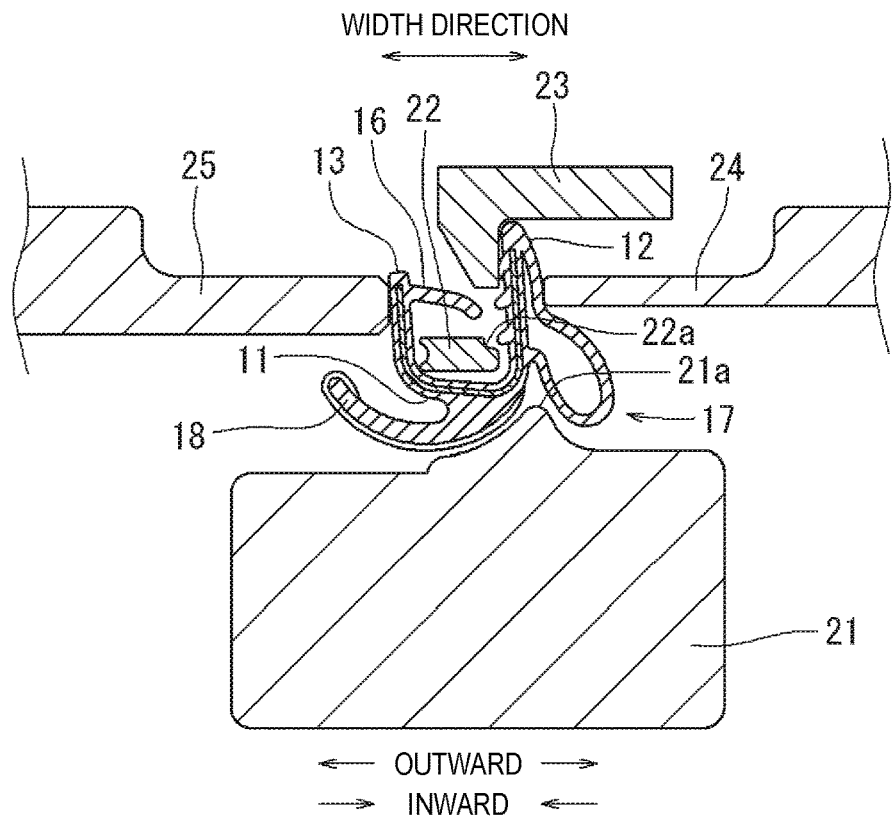
FIG. 5 is a sectional view taken along line V-V in FIG. 4 in a state in which a holding portion has an increase in opening width.
Figure 6:
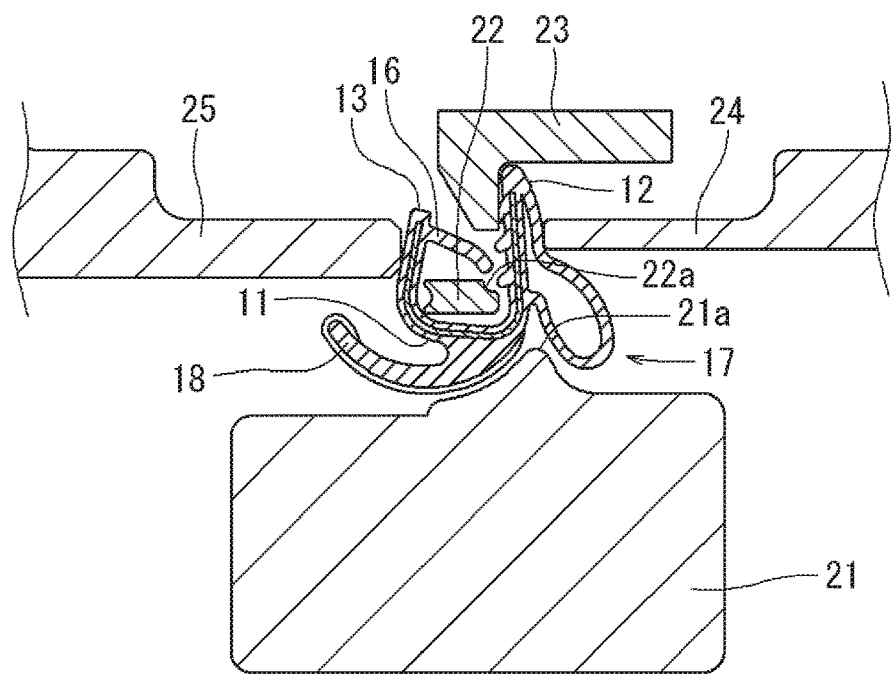
FIG. 6 is a sectional view taken along line V-V in FIG. 4 in a state in which a holding portion has a decrease in opening width.

As illustrated in FIGS. 4 to 6, the variable bender device 20 is configured to include a base member 21 that supports a lower surface of the weather strip 1, a regulating member 22 that regulates the weather strip from moving in a width direction in an angle forming process, a positioning member 23 that supports the first lateral wall 12, a pair of fine-movable roller 24 and movable roller 25 which presses the first lateral wall 12 and the second lateral wall 13 from the outer sides thereof such that angles thereof are formed, respectively, and a control unit (not illustrated) that controls positions of the fine-movable roller 24 and the movable roller 25. Note that the fine-movable roller 24 and the movable roller 25 correspond to a first press member and a second press member of the present invention, respectively. The terms, "movable" and "fine-movable", mean that rotary shafts of the fine-movable roller 24 and the movable roller 25 can be displaced inward and outward in the width direction of the weather strip 1.

The base member 21 is fixed to the central portion in the variable bender device 20 by a bolt or the like. A mounting portion 21a having a shape that follows a shape of the lower surface (accurately, a lower surface of a proximal portion of the decorative lip 18) of the bottom wall 11 of the weather strip 1 is provided at the central portion of the base member 21 in the width direction of the upper surface, which is a passing route of the weather strips 1 in a state in which the mounting portion 21a is raised from an inlet port to an outlet port of the variable bender device 20.

The regulating member 22 is fixed to a side surface of the base member 21 in the vicinity of the inlet port of the variable bender device 20, and extends to a position that is in contact with or is near to an inner surface of a boundary between the bottom wall 11 and the second lateral wall 13 of the weather strip 1 while sneaking into an upper side of the base member 21. At the position that is in contact with or is near to the inner surface of the boundary between the bottom wall 11 and the second lateral wall 13, the regulating member 22 is a long member having a rectangular cross section from the vicinity of the inlet port of the variable bender device 20 to a position between the fine-movable roller 24 and the movable roller 25. However, a facing surface of the regulating member 22 that faces the second lateral wall 13 is configured to have a recessed shape at the central portion thereof in the vertical direction. The facing surface does not come into entire contact with the second lateral wall 13, but comes into partial contact with the second lateral wall 13. As described above, with such a configuration in which the weather strip 1 and the regulating member 22 are brought into partial contact, the weather strip 1 and the regulating member 22 have small contact friction, and thus it is possible to perform smooth passing of the weather strips 1 in order. In addition, the regulating member 22 is provided with an avoidance step portion 22a on an upper edge thereof on the first lateral wall 12 side so as to avoid contact with the holding lip 16 projecting from the inner surface of the second lateral wall 13.

The positioning member 23 is also fixed to the side surface of the base member 21, which is opposite to the regulating member 22, in the vicinity of the inlet port of the variable bender device 20, and the positioning member extends to a position at which the first lateral wall 12 is pressed by the fine-movable roller 24. At the position at which the first lateral wall 12 is pressed by the fine-movable roller 24, the positioning member 23 is a long member having a hook-shaped cross section and is configured to press the upper portion of the inner surface and the upper surface of the first lateral wall 12. In addition, the positioning member 23 is provided at a position at which an angle between the first lateral wall 12 and the bottom wall 11 becomes a final angle in the weather strip 1 of the completed product when the first lateral wall 12 comes into contact with the positioning member 23.

In the embodiment, the base member 21, the regulating member 22, and the positioning member 23 form one unit, and it is possible to interchange the members for each unit according to the weather strips having various types of different cross-sectional shapes. In this manner, in a case where switching to production of a weather strip having another shape is performed, it is possible to easily and rapidly prepare for the production because the members can be interchanged for each unit in the variable bender device 20.

The fine-movable roller 24 is a disk-shaped member that rotates around a rotary shaft out of the figure, and is provided at a height positioned below the positioning member 23 on a lateral side of the base member 21 from the first lateral wall 12. The movable roller 25 is also a disk-shaped member that rotates around a rotary shaft out of the figure, and is provided to face the fine-movable roller 24 at the same height as the fine-movable roller 24 on a lateral side of the base member 21 from of the second lateral wall 13. The movable roller 25 is positioned above the regulating member 22, and the movable roller 25 comes into contact with an upper portion of the outer surface of the second lateral wall 13 of a weather strip preform. The fine-movable roller 24 and the movable roller 25 are freely movable in the width direction of the weather strip 1 under control by the control unit provided in the variable bender device 20. The movable roller 25 is provided to actively change the angle of the second lateral wall 13 in the longitudinal direction, and the fine-movable roller 24 is provided to form the angle of the first lateral wall 12 to be constant. Therefore, the movable roller 25 is thicker than the fine-movable roller 24.

Next, a manufacturing method in which the angles of the first lateral wall 12 and the second lateral wall 13 are formed into angles of the final completed product in the weather strip 1 by using the variable bender device 20 will be described. First, the weather strip performs, which are pre-formed through a known method such that the angles of the first lateral wall 12 and the second lateral wall 13 with respect to the bottom wall 11 are larger than the maximum angle of the finally completed product, are sequentially supplied from the extruder device to the variable bender device 20 (first step). Specifically, a polymer material is supplied to an extrusion mold while the core member is continuously supplied to an extruder device, and thereby the weather strip preform having the core member therein is subjected to extrusion molding. Subsequently, when the polymer material that is molded into the weather strip is rubber such as EPDM, the weather strip preform extruded from the extruder device is heated and hardened (vulcanized) by a heating device such as a high-frequency heater or a hot air heater, and then the weather strip preform is cooled by a cooling device such as a cooling water tank as necessary. When the polymer material that is molded into the weather strip is a thermoplastic synthetic resin or thermoplastic elastomer, the weather strip preform extruded from the extruder device in a semi-molten state is cooled as it is by a cooling device such as a cooling water tank and is solidified. Then, the weather strip preforms are continuously supplied to the variable bender device 20 through a core member breaking device or a roll forming device as appropriate. In the embodiment, the opening width of the holding portion in the weather strip preform is set to be larger than a dimension of the maximum thickness of the flange of the vehicle opening on which the weather strip 1 is installed.

When the weather strip preform pre-formed in the first step is supplied to the variable bender device 20, as illustrated in FIGS. 5 and 6, the weather strip preform slides over the mounting portion 21a of the base member 21. At this time, since the mounting portion 21a is formed to follow the shape of the lower surface of the bottom wall 11 (accurately, the proximal portion of the decorative lip 18), the weather strip preform or the weather strip 1 stably slides.

In addition, when the weather strip preform is supplied to the variable bender device 20, the regulating member 22 faces the boundary between the bottom wall 11 and the second lateral wall 13 of the weather strip preform. The regulating member 22 extends from the vicinity of the inlet port to the vicinity of the outlet port (at least between the fine-movable roller 24 and the movable roller 25) of the variable bender device 20 and has a function of stabilizing the sliding to the weather strip preform. At this time, the facing surface of the regulating member 22 that faces the second lateral wall 13 comes into partial contact with the boundary between the bottom wall 11 and the second lateral wall 13, and the lower surface of the regulating member 22 does not come into contact with the bottom wall 11. Therefore, since the contact friction between the regulating member 22 and the weather strip preform is reduced, the weather strip preform smoothly slides and thus vibration is reduced.

When the weather strip preform further slides toward the outlet port while being guided by the regulating member 22, the first lateral wall 12 also slides along the positioning member 23. At this time, since the positioning member 23 faces the inner surface and the upper surface of the first lateral wall 12, vibration of the weather strip preform in a vertical direction and a horizontal direction is reduced via the first lateral wall 12. In this state, when the weather strip preform slides toward the outlet port and reaches a position at which the fine-movable roller 24 and the movable roller 25 face each other, the first lateral wall 12 along with the seal portion 17 is pressed inward (the second lateral wall 13 side) by the fine-movable roller 24 and the second lateral wall 13 is also pressed inward (the first lateral wall 12 side) by the movable roller 25.

In this manner, the second lateral wall 13 is bent with the boundary with the bottom wall 11 serving as a start point. However, the regulating member 22 is in contact with the boundary between the second lateral wall 13 and the bottom wall 11 (second step). In this manner, even when a pressing force acts on the second lateral wall 13 inward by the movable roller 25, the regulating member 22 prevents the bottom wall 11 of the weather strip preform from moving toward the first lateral wall 12 side. Accordingly, the first lateral wall 12 is avoided from being inadvertently varied from the predetermined angle by the pressing force of the movable roller 25. In addition, since a region which is a bending start point of the second lateral wall 13 is pushed by the regulating member 22, it is possible to reliably bend the second lateral wall 13 to the predetermined angle.

At this time, since a bending limit of the second lateral wall 13 is not restricted by a member such as the positioning member 23, it is possible to freely set the angle between the second lateral wall 13 and the bottom wall 11 according to the thicknesses of regions of the flange of the vehicle opening (third step). In other words, the opening width of the holding portion 10 in the weather strip 1 can be partially varied in the longitudinal direction. Specifically, as illustrated in FIG. 5, a distance between the fine-movable roller 24 and the movable roller 25 increases in a region corresponding to the region in which the flange has an increase in thickness. On the other hand, as illustrated in FIG. 6, the movable roller 25 moves inward (the first lateral wall 12 side) and the distance between the fine-movable roller 24 and the movable roller 25 decreases in a region corresponding to the region in which the flange has a decrease in thickness. At this time, even when the angle between the second lateral wall 13 and the bottom wall 11 decreases (acute angle), the avoidance step portion 22a is provided on the regulating member 22. Therefore, the holding lip 16 does not come into contact with the regulating member 22.

On the other hand, the first lateral wall 12 is also bent with the boundary between the bottom wall 11 serving as the start point, and is pushed to the positioning member 23. In this manner, the angle between the first lateral wall 12 and the bottom wall 11 becomes the final angle in the weather strip 1 of the completed product, and thereafter, the constant angle is maintained as it is without a change and the weather strip is guided to the outlet port (fourth step).

A timing of moving in the width direction, a moving direction, and a moving distance of the movable roller 25 can be freely controlled, based on the thicknesses of the regions of the flange, by the control unit in which the thicknesses of the regions of the flange are stored in advance. More specifically, the control unit detects a moving speed of the weather strip 1, and the movable roller 25 is subjected to moving control at a timing at which the opening width of the holding portion 10 corresponding to the thicknesses of the regions of the flange of the vehicle opening is to be appropriately varied. The movement of the movable roller 25 is controlled by transmitting a signal to a hydraulic or air cylinder, a motor, or the like as a moving mechanism.

As described above, the angle formed between the second lateral wall 13 and the bottom wall 11 is arbitrarily changed according to the thicknesses of the regions of the flange of the vehicle opening. However, the angle formed between the first lateral wall 12 and the bottom wall 11 is constant. Hence, the fine-movable roller 24 does not basically move in the width direction. However, even when the regulating member 22 is provided, when the angle formed between the bottom wall 11 and the second lateral wall 13 in the weather strip preform is large, in some cases, there is a concern that the position of the bottom wall 11 will be displaced from the predetermined position to the first lateral wall 12 side due to, for example, sliding of the boundary between the second lateral wall 13 and the bottom wall 11 below the regulating member 22. In this case, since the first lateral wall 12 continuous with the bottom wall 11 is separated from the positioning member 23, a problem arises in that the angle formed between the bottom wall 11 and the first lateral wall 12 will not become the predetermined final angle. In the case where the problem arises, the fine-movable roller 24 is caused to move from the predetermined position to the positioning member 23 side in synchronization with the movable roller 25 or with a slight delay from the movement of the movable roller 25 when passing over a certain limit position. In this manner, the first lateral wall 12 and the bottom wall 11 return to the predetermined positions, and thus the problem described above is solved. The moving distance, the movement timing, or the like of the fine-movable roller 24 is also appropriately controlled by the control unit according to the movement state of the bottom wall 11. However, the moving distance of the fine-movable roller 24 is to the extent that the bottom wall 11 or the first lateral wall 12 can return to originally predetermined positions due to a spring-back phenomenon of the core member 14.

Then, the weather strip 1 that has passed through the variable bender device 20 is cut by a cutter to have a predetermined length dimension. In this manner, manufacturing of the weather strips having various cross-sectional shapes corresponding to various thicknesses of the flange is completed.

Figure 7:
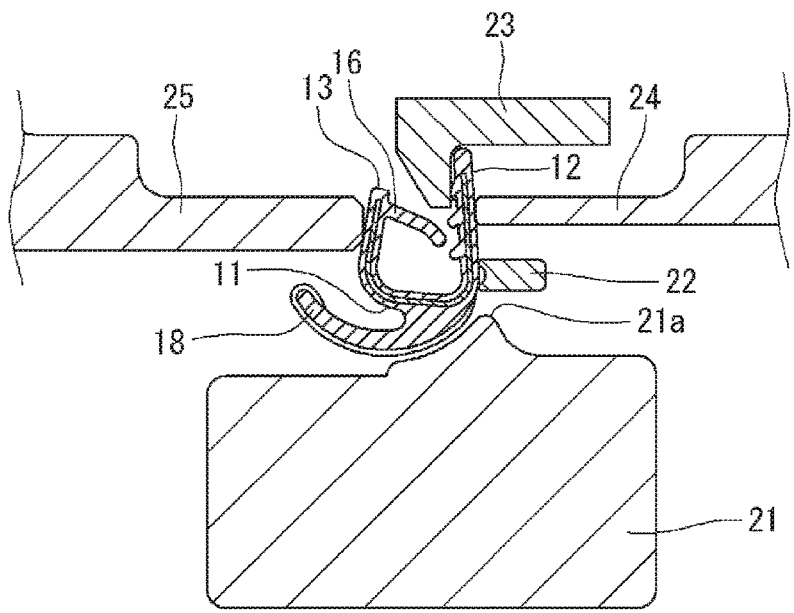
FIG. 7 is a sectional view of a modification example.
Figure 8:
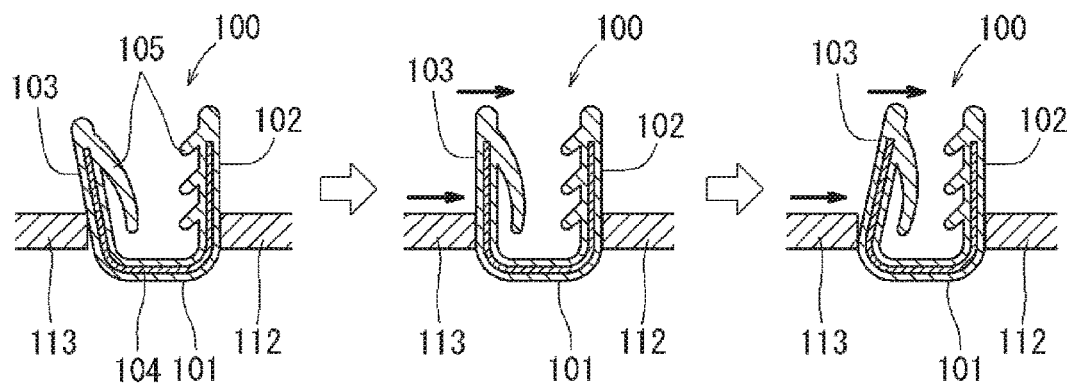
FIG. 8 is a sectional view illustrating angle formation that is assumed in related art.
Figure 9:
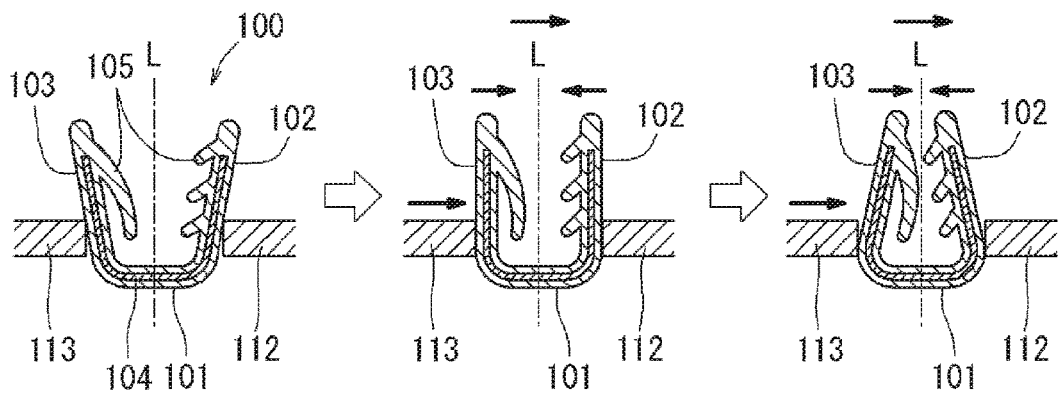
FIG. 9 is a sectional view illustrating angle formation that is actually performed in the related art.

The representative embodiment of the present invention has been described above. However, the present invention is not limited thereto, and it is possible to perform various modifications in a range without departing from the spirit of the present invention. For example, it is only necessary that the long member includes the holding portion 10 configured to include the bottom wall 11, the first lateral wall 12, the second lateral wall 13, and the core member 14 embedded therein, and the present invention can also be applied to manufacturing of a weather strip that does not include the seal portion 17 or the decorative lip 18. As illustrated in FIG. 7, when the weather strip does not include the seal portion 17, it is also possible to provide the regulating member 22 on the outer surface of the boundary between the first lateral wall 12 and the bottom wall 11. Also in such an embodiment, the regulating member 22 can regulate the boundary between the bottom wall 11 and the second lateral wall 13 from moving toward the first lateral wall 12. Note that, in a case where the regulating member 22 is provided on the outer surface of the boundary between the first lateral wall 12 and the bottom wall 11, the regulating member 22 does not need to be provided with the avoidance step portion 22a.

In addition, the regulating member 22 can be formed to come into contact not only with the inner surface of the boundary between the second lateral wall 13 and the bottom wall 11 but also with the inner surface of the boundary between the first lateral wall 12 and the bottom wall 11. In the configuration, it is possible to reliably form also the angle of the first lateral wall 12 by the regulating member 22.

The pressing member is not limited to the roller, as long as the pressing member has low friction by which a front surface of the wall is not damaged when the outer surfaces of the first lateral wall 12 and the second lateral wall 13 are pressed. For example, it is possible to use a bar-shaped member or a circular non-rotating metal plate on which Teflon (®) processing is performed. In addition, it is not necessary for the roller that presses the first lateral wall 12 to move inward and outward in the width direction, and it is possible to use an immovable roller.

The opening width of the holding portion 10 in the weather strip preform does not need to be set to be larger than the maximum opening width of the holding portion 10 in the weather strip 1 which is the completed product, and can be set to be the same as the maximum opening width. In other words, in the first step, the angle between the bottom wall 11 and the first lateral wall 12 and the angle between the bottom wall 11 and the second lateral wall 13 in the weather strip preform can be pre-formed to be constant in the longitudinal direction at the same angle as the final maximum angle thereof. In this case, the positioning member 23 or the fine-movable roller 24 need not be necessarily provided. However, even in this case, it is preferable that the fine-movable roller 24 is provided in that it is possible to correct the positional shift of the bottom wall 11. In addition, even in this case, when the positioning member 23 is provided, there is also a merit of reducing the vibration of the weather strip preform. On the other hand, in the first step, the angle between the bottom wall 11 and the first lateral wall 12 and the angle between the bottom wall 11 and the second lateral wall 13 cannot be made smaller than the final maximum angles. This is because, in such case, it is not possible to form the holding portion 10 corresponding to the thickest region of the flange of the vehicle opening in the third step.

The regulating member 22 and the movable roller 25 may be configured to simultaneously come into contact with the weather strip preform, or may be configured such that the regulating member 22 does not come into contact with the weather strip preform in the region in which the movable roller 25 is pressed. In other words, the second and third steps in the present invention need not be simultaneously performed. In addition, it is not necessary for the fine-movable roller 24 to come into contact with the weather strip preform simultaneously with the regulating member 22 or the movable roller 25. In other words, the fourth step in the present invention need not be simultaneously performed with the second and third steps.

The regulating member 22 need not have the rectangular cross-sectional shape, and can have a shape such as a circle, an ellipse, or a triangle. In this case, since the contact area with the weather strip preform is small even when the regulating member 22 is not provided with the recessed portion, the contact friction between the regulating member 22 and the weather strip preform is low, and the same effect of accurate bending of the second lateral wall 13 as the embodiment described above is obtained.

The base member 21, the regulating member 22, and the positioning member 23 do not need to form one unit, and it is possible for the members to be individually provided. Conversely, the regulating member 22 and the positioning member 23 can also be integrally formed as one member.

In the embodiment described above, only an example in which the opening width of the holding portion 10 in the weather strip 1 of the completed product has two types of dimensions is described. However, the present invention does not limited thereto, and, in a case where the flange of the vehicle opening has three or more different thicknesses, it is possible for the opening width of the holding portion 10 to be set to have three or more different widths corresponding to the respective different regions.

The invention claimed is:

1. A method for manufacturing a long member made of a polymer material through extrusion molding, the long member including a holding portion including: a bottom wall; a first lateral wall and a second lateral wall which stand from both ends of the bottom wall; and a metal core member that is embedded in the bottom wall, the first lateral wall, and the second lateral wall from the bottom wall to the first lateral wall and the second lateral wall, an angle between the bottom wall and the first lateral wall being constant throughout in a longitudinal direction, and an angle between the bottom wall and the second lateral wall being partially varied in the longitudinal direction, the method comprising:

a first step of pre-forming the angle between the bottom wall and the first lateral wall and the angle between the bottom wall and the second lateral wall to be constant in the longitudinal direction and equal to or larger than final maximum angles thereof;

a second step of regulating a boundary between the bottom wall and the second lateral wall from moving toward the first lateral wall after the first step; and a third step of forming the angle between the bottom wall and the second lateral wall into a final angle by partially varying, in the longitudinal direction, the angle between the bottom wall and the second lateral wall, wherein, in the second step, a regulating member is brought into contact with an inner surface of the boundary between the bottom wall and the second lateral wall or an outer surface of a boundary between the bottom wall and the first lateral wall, wherein a lower surface of the regulating member is set during manufacturing so as not to come into contact with the bottom wall, and wherein, in the third step, the angle between the bottom wall and the second lateral wall is formed into the final angle by an angle forming member which is different from the regulating member.

2. The method for manufacturing the long member according to claim 1, further comprising:

a fourth step of forming the angle between the bottom wall and the first lateral wall into a final angle after the first step.

3. The method for manufacturing the long member according to claim 2, wherein, in the third and fourth steps, a second pressing member and a first pressing member, which are capable of being displaced in an inward/outward direction in a width direction of the long member, press the second lateral wall and the first lateral wall inward, respectively, from outer sides of the second lateral wall and the first lateral wall.

4. The method for manufacturing the long member according to claim 2, wherein, in the fourth step, a positioning member that holds at least a part of an inner surface and an upper end of the first lateral wall is provided.

5. The method for manufacturing the long member according to claim 3, wherein, in the fourth step, in a case where the bottom wall is subjected to a positional shift in the width direction, the first pressing member is displaced in the inward/outward direction, corresponding to the positional shift.

6. The method for manufacturing the long member according to claim 1, wherein the second step and the third step are simultaneously performed.

7. The method for manufacturing the long member according to claim 2, wherein the second step to the fourth step are simultaneously performed.

8. The method for manufacturing the long member according to claim 1, wherein the angle forming member includes a pair of rollers.

* * * * *